Oct. 22, 1963   E. VÖGELI   3,107,895
VALVE SEAT CONSTRUCTION
Filed Sept. 10, 1959
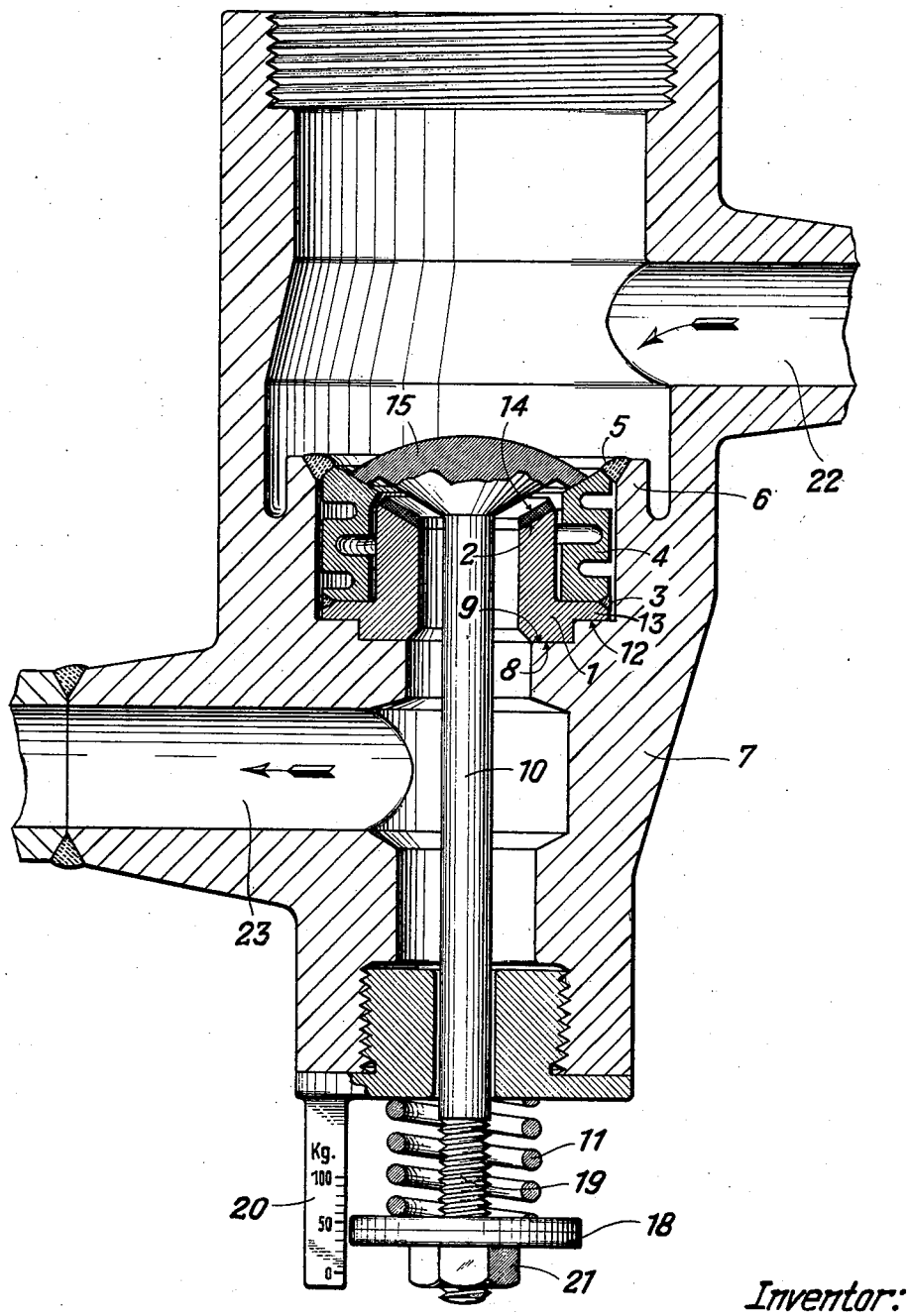
Inventor:
ERNST VÖGELI
By Irwin S. Thompson
ATTY.

United States Patent Office 3,107,895
Patented Oct. 22, 1963

3,107,895
VALVE SEAT CONSTRUCTION
Ernst Vögeli, Wiesendangen, Zurich, Switzerland, assignor to Sulzer Freres, Societe Anonyme, Winterthur, Switzerland
Filed Sept. 10, 1959, Ser. No. 839,118
Claims priority, application Switzerland Sept. 11, 1958
4 Claims. (Cl. 251—359)

This invention relates to a valve with a seat element bearing on a supporting surface of the valve housing, which seat element has a seating face for a valve body performing the opening and closing motion.

According to this invention, the seat element is pressed against a supporting surface provided in the valve housing by an elastic intermediate piece welded to form a sealed joint and under initial stress between the seat element and the valve housing. In the process of manufacturing a valve according to the invention, the seat element and the elastic intermediate piece are welded together, then inserted jointly until the valve seat element strikes against the supporting surface, after which the intermediate piece is put under initial stress by means of a tensioning device and welded to the housing.

Because of the initial stress of the elastic intermediate piece acting on it, the seat element cannot be lifted from its supporting surface or be brought into an undesired slanted position, as can be the case, for example, if the seat element is welded directly to the valve housing. In a construction of the known type in which the valve seat element is welded directly to the valve housing, thermal stresses occur sometimes during the welding of the seat element to the valve housing since it is not possible to weld uniformly over the entire joint. Besides, the seat element is heated more during the welding than the housing and therefore contracts more on cooling after welding than the housing. For this reason, the seat element of known construction detaches itself sometimes from the supporting surface during the cooling and moves into a more or less slanted position, so that the valve body does not seat properly and the valve is leaky or untight from the start. According to the invention, inaccuracies of craftsmanship, as they occur occasionally in welding, are also avoided. The seat element, even if one of the weldings should not be exact, has always its exact position necessary for the completely tight seating of the valve body on its seat in closed position of the valve. This is due to the elastic intermediate piece that equalizes all inaccuracies because of its initial stress, and this exact position is maintained even after prolonged use.

An object of this invention is to provide a valve in which the seat element is accurately positioned and secured on a support therefor in the valve housing.

Another object of this invention is to provide a valve in which the seat element is pressed against its support by an elastic element welded to the seat element and to the housing.

In the drawing:

The single FIGURE is a sectional view of an embodiment of a valve according to this invention, with the valve body omitted.

The valve, assembled in a water supply line 22, 23 for regulating the steam temperature of a boiler plant by the addition of water, comprises a valve housing 7 in which a supporting surface 8 for a valve seat element 1 is provided. The seat element 1 bears with its lower end surface 9 on the supporting surface 8 and carries on the opposite upper end surface at 2 a seating surface 14 which is made, for example, of an alloy known by the name of "Stellite," which consists substantially of cobalt and chromium. Against the seating surface 14 is pressed in closed position a valve body (not shown) which performs the opening and closing of the valve.

The seat element 1 has a surrounding flange 13 having a lower surface 12 which is relatively close to the lower end surface 9. As shown, the flange is tightly welded at 3 to a bellows-like elastic intermediate piece or element 4. The other end of the element 4 is tightly welded at 5 to a lip 6 of the valve housing 7, with the element 4 under initial stress. Due to the stress of the element 4, the seat element 1 is constantly pressed with its end surface 9 against the supporting surface 8 of the housing so that the seating surface 14 maintains its correct position, the valve body is properly seated, and the valve remains constantly tight in closed position.

Before the parts are assembled, the seat element 1 and the elastic element 4 are tightly welded together at 3 while outside the housing. Then the assembled parts 1 and 4 are inserted, as shown in the drawing, from the top jointly into the housing 7 until the surfaces 9 and 12 strike against the supporting surface 8 and the surface of the housing opposite surface 12. Then a spindle 10 provided with a disk-shaped head 15 is inserted from the top. After interposing a spring 11 and a washer 18, a nut 21 is screwed on the lower thread 19 of the spindle 10 and the resilient or elastic element 4 is brought to the desired initial stress by tightening the nut 21. The initial stress can be read from a previously calibrated measuring scale 20, for example in kgs., and can be of the order of 50 to 500 kgs. In this position, with the seat element pressed against its supporting surface in the housing by the stressed elastic piece 4, the element 4 is welded at 5 to the lip 6. Then the nut 21 is loosened and the parts 18, 11, 10 are removed. Subsequently the valve body (not shown) cooperating with the seating surface 14 is inserted.

During operation of equipment with which the valve is used, steam of 500° to 600° C., for example, and 300 atm. flows through a line (nots hown) to which water of 300° C., for example, and a corresponding excess pressure can be added through the line 22, 23 by opening the valve, so that the temperature of the steam can be regulated.

The valve can naturally also be used in other installations.

Having described my invention, I claim:

1. In a valve, a valve housing having a valve chamber therein, inlet and outlet passages disposed in said valve housing and communicating through said valve chamber, a supporting surface disposed in one end of said valve chamber, a seat element disposed in said valve chamber, said seat element including a lower end abutting against said supporting surface, an upper end containing a seating surface, and a flange portion adjacent said lower end, an intermediate elastic tubular member disposed in said valve chamber having one end abutting against said flange portion to apply uniform annular pressure thereon, the other end of said intermediate elastic tubular member being disposed adjacent the other end of said valve chamber while being under stress to press said lower end of said seat element into permanent sealing engagement against said supporting surface of said valve chamber, and means to secure the other end of said intermediate elastic tubular member to the other end of said valve chamber so that said seating surface maintains its correct position.

2. In a valve according to claim 1 in which said one of said intermediate elastic member is secured to said flange portion by a deposit of weld and said means to secure the other end of said intermediate elastic member to the other end of said valve chamber consists of a deposit of weld.

3. In a valve according to claim 1 in which a further supporting surface is disposed in the one end of said valve chamber adjacent said supporting surface, said flange portion abutting against said further supporting surface.

4. In a valve according to claim 1 in which said intermediate elastic tubular member has a bellows-like configuration.

References Cited in the file of this patent

UNITED STATES PATENTS

| | | |
|---|---|---|
| 647,192 | Lunken | Apr. 10, 1900 |
| 1,732,241 | Murray | Oct. 22, 1929 |
| 2,224,857 | Cram | Dec. 17, 1940 |
| 2,261,489 | Venton | Nov. 4, 1941 |
| 2,347,676 | Eplett | May 2, 1944 |
| 2,851,768 | Ellis | Sept. 6, 1958 |
| 2,887,295 | Bredtschneider | May 19, 1959 |

FOREIGN PATENTS

| | | |
|---|---|---|
| 500,785 | Great Britain | of 1939 |